Figure 1:
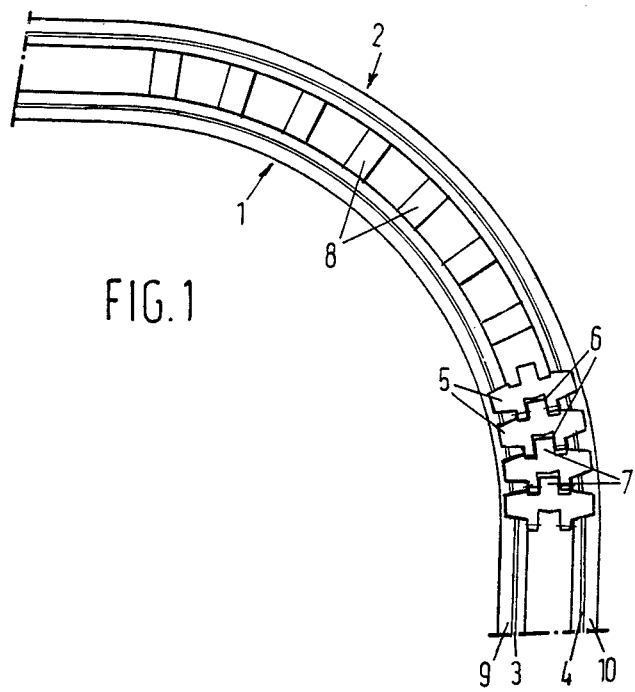

United States Patent [19]

Wallaart

[11] Patent Number: 4,742,906
[45] Date of Patent: May 10, 1988

[54] BEND SEGMENT FOR THE TRACK OF A CHAIN CONVEYOR

[75] Inventor: Jacobus J. Wallaart, 's-Gravenzande, Netherlands

[73] Assignee: M.C.C. Nederland B.V., 's-Gravenzande, Netherlands

[21] Appl. No.: 880,826

[22] Filed: Jul. 1, 1986

[30] Foreign Application Priority Data

Jul. 5, 1985 [NL] Netherlands .................... 8501928

[51] Int. Cl.⁴ .............................................. B65G 23/18
[52] U.S. Cl. ................................... 198/805; 198/690.1
[58] Field of Search ............................. 198/690.1, 805

[56] References Cited

U.S. PATENT DOCUMENTS 3,980,173 9/1976 Riggs ............................ 198/805 X
4,643,298 2/1987 Wallaart ............................ 198/805

FOREIGN PATENT DOCUMENTS 1456124 11/1976 United Kingdom ............. 198/690.1
2037690 12/1982 United Kingdom ................ 198/805
1033386 8/1983 U.S.S.R. ............................ 198/805

Primary Examiner—Robert J. Spar
Assistant Examiner—Lyle K. Kimms
Attorney, Agent, or Firm—Morgan & Finnegan

[57] ABSTRACT

A bend segment for a chain conveyor comprising a chain movable over a track including one or more bends, said chain being composed of links of a magnetizable material having a substantially rectangular load bearing surface, the successive links in the chain being pivoted together. The bend segment includes a device for producing a magnetic field to retain the load bearing surfaces of the links flat on the track, which consists of a pair of rails of a magnetizable material wherebetween are provided, at predetermined distances, members for interconnecting the rails and/or for keeping these spaced apart. A synthetic plastics strip is provided in at least the inner bend of the bend segment against the inside of the rail. The device for producing a magnetic field include magnets placed between the rails, with the magnetic lines of force of the magnetic field produced by the magnets extending through the rails to attract the chain links against the rails.

6 Claims, 1 Drawing Sheet

BEND SEGMENT FOR THE TRACK OF A CHAIN CONVEYOR

The present invention relates to a bend segment for a chain conveyor comprising a chain movable over a track including one or more bends, said chain being composed of links of a magnetizable material having a substantially rectangular load bearing surface, the successive links in the chain being pivoted together, said bend segment including means for producing a magnetic field to keep the load bearing surfaces of the links flat on the track.

A similar bend segment for a conveyor adapted to transport bottles, tins and the like containers is known from Dutch patent application No. 7706900.

The known bend segment includes a U-shaped synthetic plastics body, the legs of the U containing magnets for attracting the chain made of magnetizable material. This known bend, the so-called magnetic bend, has the substantial advantage that the links of the chain need not have means for keeping the chain in the bend flat, which means, e.g. lips extending at the underside of the chain links, coact with members specially provided in the bend, e.g. slots for receiving the lips. The known magnetic bend, however, is expensive and sensitive to wear and has the drawback that the magnetic field in longitudinal direction of the bend, through application of discrete magnets, cannot be entirely homogeneous, which leads to an irregular running when the conveyor chains slows down. Besides, bend segments of different radii in the known magnetic bend can only be obtained by manufacturing synthetic plastic bodies with the different radii, which requires different, expensive moulds. Consequently, there is a need for a bend segment that is wear-resistant and inexpensive to manufacture, with the chain having a very smooth running, which bend segment can be manufactured inexpensively with different radii.

It is an object of the present invention to provide a magnetic bend segment which, relative to the known magnetic bend segment, has strongly improved properties.

To this effect, the present invention provides a bend segment of the above described type, wherein the track consists of two rails made of a magnetizable material, between which rails there are disposed members at predetermined interspaces interconnecting the reails and/or keeping the same spaced apart, while in at least the inner bend of the bend segment, against the inner side of the rail, there is positioned a plastics strip, and wherein the means for producing the magnetic field include magnets interspaced between the rails at predetermined distances, while the magnetic lines of force of the magnetic field produced by the magnets extend through the rails for pulling the chain links against the rails. Preferably, the magnets form part of the spacer and/or connector members.

The bend segment according to the present invention has the advantage that the magnetic field produced by the magnets in the metal rails is homogeneous, so that the chain, even at low speeds, runs very smoothly and that the magnetic force in the bend can be adjusted in a simple manner to a specific application by placing more or less magnets per unit of length in the bend segment and/or magnets having a greater or lesser magnetic force. Preferably, also the return portion of the chain of the conveyor, said chain forming a closed loop, is retained in the bends of the track through magnetic force. To this end, the return portion is conducted along the underside of the rails and is retained by the same magnetic force as the upper portion. A great advantage thereof is that the chain in the bend of the track can no longer move up and down, the so-called wandering, so that the conveyor produces less noise than the known conveyors, which aspect is deemed of great importance at present.

Further advantages of the bend segment according to the present invention are that the bend segment, in fact, is indestructible, since the underside of the load bearing surface of the chain links rides over the rails, while the wear of the metal rails has no influence whatever on the quality of the magnetic field, and that the bend portion sensitive to wear, i.e., the inner liner of the rails in the inner bend portions, against which the side of chain abuts, is a plastics strip that can be easily replaced without demounting the entire bend, which strip, moreover, can be inexpensive. Besides, the bend segment according to the present invention is less sensitive to fouling, as the bend segment has no closed U-shape, with dirt accumulating on the flat side of the U, between the legs, but consists of rails that are interconnected at spaced apart locations, with dirt between the rails falling downwardly via the relatively large interspace between the connecting members. Finally, the bend segment according to the present invention, without requiring different moulds or the like, can be manufactured in a simple manner with different radii by bending the rails having the desired radius and subsequently by interconnecting the rails by means of the connecting members.

Figure 2:
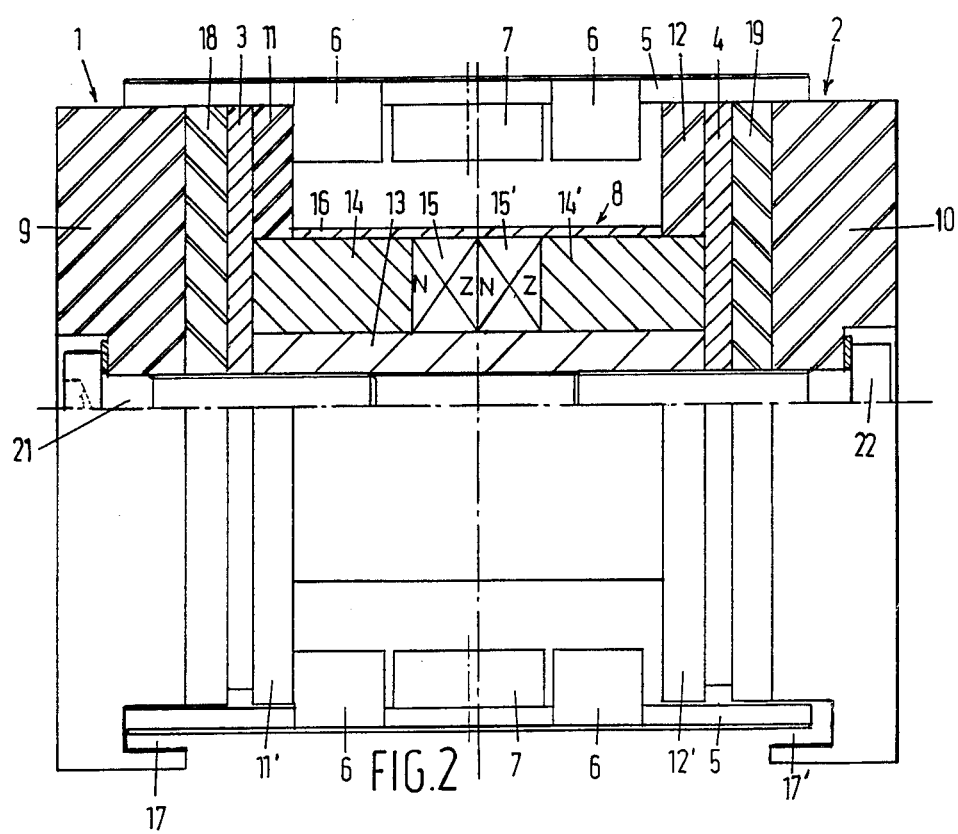

One embodiment of the bend segment according to the present invention will now be described, by way of example, with reference to the accompanying drawings, in which:

FIG. 1 is a diagrammatic top view of the bend segment according to the present invention; and FIG. 2 is a part-cross sectional side view of a first embodiment.

In the figures, identical parts are indicated by identical reference numerals.

The bend segment according to the present invention for a chain conveyor comprises an inner bend track 1 and an outer bend track 2. The inner bend track accommodates a rail 3 and the outer bend track a rail 4. On inner track 1, accommodating rails 3, and outer track 2, accommodating rail 4, rest the undersides of the essentially rectangular load bearing surfaces of chain links 5. Each link 5 has on one end spaced hinge loops 6 and on the other end a central hinge loop 7. The spaced hinge loops 6,7 are always connected in a known per se manner through a hinge pin, not shown, to the central hinge loop of an adjoining link. The inner bend track 1 is connected through connecting members 8 to the outer bend track 2.

FIG. 2 is a part-crossectional side view of the bend segment according to the present invention, which is adapted to keep the chain links 5 in the bend flat on the track through magnetic force.

The bend segment comprises rails 3,4 made of a magnetizable material, bent in such a manner that they provide a bend segment of the desired radius and the desired distance between the rails. On the exterior of the rails there are disposed preferably plastics outer guide strips 9,10. The tops of said strips form a part of the top surface of the inner, and outer bend track, respectively, while the undersides of said strips, in a manner to be discussed hereinafter, perform a function in the guidance of the return portion of the chain. Between the outer guide strips 9, 10 and rails 3,4 there may be positioned filler strips 18, 19 e.g. of synthetic plastics material. The use of such filler strips, however, is often not necessary.

Against the inside of rails 3,4 are placed preferably plastics inner guide strips 11,12. The tops of said strips likewise form part of the guiding surface of the inner, and outer bend track, respectively. Strip 11 situated in the inner bend is the most sensitive to wear, since the chain, during its advance, will always follow the shortest path through the bend, so that hinge loops 6 of the chain links 5 abut against strip 11. In the bend segment according to the present invention, strip 11 can be replaced in a very simple manner without the necessity of demounting the entire bend.

In order to keep rails 3, 4 spaced apart and to interconnect the same, there are provided between the rails spacer members 8, including in the embodiment shown in FIG. 2, a bushing 13 of non-magnetizable material in whose interior there is formed a screw thread. In said screw thread in bushing 13 there are disposed from the exterior of the guide strips 9, 10, respectively, bolts 21,22, respectively, which keep the strips 9,10, the filler strips 18,19 and rails 3,4 together. Around bushing 13 there are placed annular bushings 14,14' made of a magnetizable material, while around the bushing 13, between bushings 14,14', there are provided annular magnets 15,15'. In the embodiment shown, the north pole N of magnet 15, as viewed in FIG. 2 is located at the left and the south pole Z of magnet 15' at the right. The magnetic lines of force extend from the north pole of the annular magnets 15, via bushing 14 through rail 3, through the chain links 5, through the rail 4, via bushing 14', to the south pole of magnet 15'.

This applies both to the upper, forward running portion of the chain and to the lower, return portion thereof. Around bushings 14,14' and the annular magnets 15,15' there is fitted a plastics bushing 16, which on the one hand protects the bushings and magnets against fouling and on the other hand serves for retaining the guide strips 11,12 against rails 3,4, respectively. As a result, strips 11,12 and in particular strip 11, can be replaced easily by slightly loosening bolts 21, and/or 22, thus producing clearance between bushing 16 and strip 11 and/or 12, so that these can be conveniently removed without the necessity of demounting the entire bend segment.

Although the magnets, such as 15 and 15', are placed preferably around the attaching means, consisting of bushing 13 and bolts 21,22 the magnets may also be fitted between the rails in a different manner, with the attaching members for the magnets differing from those for the rails. Depending on the specific application of the bend segment, it is possible to fit a stronger or less strong magnet around each bushing 13, while also depending on the desired strength of the magnetic field, magnets may be fitted either around all bushings 13 or around only some of said bushings.

Bushing 13 is made of a non-magnetizable material, since this bushing would otherwise short-circuit the magnetic field of magnets 15,15'.

On the inside of the underside of the outer guide strips 9,10 are formed slots 17 and 17', respectively, for receiving the outer edges of chain links 5. Said slots have only a safety function to prevent the chain from falling downwards in the case that the force of the magnetic field should somehow drop out or decrease. For the rest, also the return portion of the chain is retained against the underside of said rails by the magnetic lines of force passing through the rails 3,4. Since the magnetic force for the return portion of the chain may be less than for the forward portion, upper portion thereof, rails 3,4 are arranged preferably with a small air gap relative to the chain links to thereby slightly attenuating the magnetic field. The inner guide strips 11' and 12' for the return portion can be integral with strips 11 and 12, or be separated therefrom.

What I claim:

1. A bend segment for a chain conveyor comprising a chain movable over a track including one or more bends, said chain being composed of links of a magnetizable material having a substantially rectangular load bearing surface, the successive links in the chain being pivoted together, said bend segment including means for producing a magnetic field to retain the load bearing surface of the links flat on the track, characterized in that the bend segment comprises a pair of rails of a magnetizable material; elongated interconnecting means for the rails, said means being positioned at predetermined distances between both rails; and a synthetic plastics guide strip against the inside of the rail in at least the inner bend of the bend segment; and in that the means for producing a magnetic field comprise annular magnets placed between the rails, around said interconnecting means, with the magnetic lines of force of the magnetic field produced by the magnets extending through the rails to attract the chain links against the rails.

2. A bend segment according to claim 1 characterized in that the interconnecting means around which magnets are placed, include a bushing of a non-magnetizable material which bushing connects both rails and means to mount the bushing to both rails.

3. A bend segment according to claim 2 characterized in that sleeves of a magnetizable material are provided around those interconnecting means that carry the annular magnets, these sleeves being located between each rail and the magnet located the nearest to that rail.

4. A bend segment according to claim 1, characterized in that also in the outer bend of the bend segment there is provided a synthetic plastics guide strip against the inside of the rail.

5. A bend segment according to claims 2, 3 or 4 characterized in that around at least a number of the annular magnets there is provided a sleeve to press the plastics guide strip or strips against the rail(s).

6. A bend segment according to claim 1 for guiding a chain with an upper run and a lower return run, characterized in that synthetic plastics strips are provided against the outer sides of the rails, the side of each strip facing the rail being provided with slots for receiving the sides of the chain links of the lower return run.

* * * * *